United States Patent [19]

Ohsawa et al.

[11] Patent Number: 5,896,251
[45] Date of Patent: Apr. 20, 1999

[54] MAGNETORESISTANCE EFFECT HEAD WITH CONDUCTOR FILM PAIR AND MAGNETIC FIELD PROVING FILM PAIR DISPOSED BETWEEN SUBSTRATE AND MAGNETORESISTANCE EFFECT FILM

[75] Inventors: Yuichi Ohsawa, Ota; Hiroaki Yoda, Kawasaki, both of Japan; Reiko Kondoh, Palo Alto, Calif.

[73] Assignee: Kabushiki Kaisha Toshiba, Kawasaki, Japan

[21] Appl. No.: 08/577,075

[22] Filed: Dec. 22, 1995

[30] Foreign Application Priority Data

Dec. 26, 1994 [JP] Japan .................................. 6-323081

[51] Int. Cl.$^6$ ...................................................... G11B 5/39
[52] U.S. Cl. ........................................................... 360/113
[58] Field of Search ...................................... 360/113, 126

[56] References Cited

U.S. PATENT DOCUMENTS

| | | | |
|---|---|---|---|
| 4,639,806 | 1/1987 | Kira et al. | 360/113 |
| 4,663,685 | 5/1987 | Tsang | 360/113 |
| 5,287,238 | 2/1994 | Baumgart et al. | 360/113 |
| 5,434,826 | 7/1995 | Ravipati et al. | 360/113 |
| 5,438,470 | 8/1995 | Ravipati et al. | 360/113 |
| 5,442,507 | 8/1995 | Koga et al. | 360/113 |
| 5,461,526 | 10/1995 | Hamakawa et al. | 360/113 |
| 5,508,866 | 4/1996 | Gill et al. | 360/113 |
| 5,532,892 | 7/1996 | Nix et al. | 360/113 |
| 5,583,725 | 12/1996 | Coffey et al. | 360/113 |
| 5,608,593 | 3/1997 | Kim et al. | 360/113 |
| 5,641,557 | 6/1997 | Ishiwata | 360/113 |
| 5,646,805 | 7/1997 | Shen et al. | 360/113 |

FOREIGN PATENT DOCUMENTS 60-59518  4/1985  Japan .
64-1114   1/1989  Japan .

OTHER PUBLICATIONS

Samuel W. Yuan et al., "Micromagnetics of GMR spin-valve heads", J. Appl. Phys. 75 (10), 15 May 1994, pp. 6385 and 6386 and 6387.

*Primary Examiner*—Craig A. Renner
*Attorney, Agent, or Firm*—Finnegan, Henderson, Farabow, Garrett & Dunner, L.L.P.

[57] ABSTRACT

A magnetoresistance effect head comprises a magnetoresistance effect element portion including a magnetoresistance effect film having a magnetic field response portion, a magnetic field providing film for providing the magnetoresistance effect film with a bias magnetic field, and a conductor film for supplying a current to the magnetoresistance effect film, wherein the magnetoresistance effect element portion has a laminate structure portion being composed of at least the conductor film, the magnetic field providing film, and the magnetoresistance effect film layered in this order at other than the magnetic field response portion. The magnetoresistance effect head is obtained by patterning a laminate film composed of a conductor film and a magnetic field providing film corresponding to a lead shape, forming an MR film, and patterning the MR film corresponding to a lead shape and the shape of a magnetic field response portion. Alternatively, a magnetic field providing film and a conductor film are layered in the order in a passive region other than the magnetic field response portion, forming a laminate film such that the magnetic field providing film is exposed at surface of the edge portion on the magnetic field response portion side. The MR film is formed on almost only the magnetic field response portion so that the MR film overlaps with the exposed portion of the magnetic field providing film.

7 Claims, 13 Drawing Sheets

MAGNETORESISTANCE EFFECT HEAD WITH CONDUCTOR FILM PAIR AND MAGNETIC FIELD PROVING FILM PAIR DISPOSED BETWEEN SUBSTRATE AND MAGNETORESISTANCE EFFECT FILM

BACKGROUND OF THE INVENTION

1. Field of the Invention

The present invention relates to a magnetoresistance effect head used as a reproducing head of a magnetic disk apparatus or the like, a fabrication method thereof, and a magnetic recording/reproducing head therewith.

2. Description of the Related Art

In recent years, the record density of magnetic recording apparatuses has been increased. High record density systems such as VCRs for 500 Mb/inch$^2$ and HDDs for 200 Mb/inch$^2$ have been commercially used. However, much higher record density is required for magnetic recording apparatuses. As a reproducing head for use with a high record density system, a magnetoresistance effect head using magnetoresistance effect of which an electric resistance of a magnetic thin film, a magnetic laminate, or the like varies corresponding to an external magnetic field is becoming attractive (hereinafter the magnetoresistance effect head is referred to as an MR head).

A conventional MR element using anisotropic magnetoresistance effect (hereinafter referred to as AMR) has an AMR film composed of a single layer of a NiFe alloy film or the like with a thickness of around 30 nm. To provide the AMR film with an operating point bias, an SAL bias film or the like is layered. The thickness of the bias film is around 20 to 30 nm. On the other hand, as a method for providing the AMR film with a longitudinal bias, an antiferromagnetic film such as a FeMn film is formed in a passive region other than a track portion.

FIG. 1 shows the structure of principal portions of an MR head having the conventional AMR film. As shown in FIG. 1, in the AMR element portion of the conventional AMR head, an AMR film 3 is layered on a laminate film composed of a soft magnetic film 1 and non-magnetic film 2 (namely, an SAL bias film) that provides an operating point bias. An antiferromagnetic film 4, which is a magnetic field providing film that provides a longitudinal bias, and a lead film 5, which is a conductor film composed of for example a Cu film that supplies a current to the AMR film 3, are formed in a passive region other than a track portion 3a. In other words, the width of the track portion 3a is defined corresponding to the pattern shape (lead shape) of the lead film 5.

As a patterning method of the above-described lead film 5, a lift-off method or an ion milling method is used. In the lift-off method, a resist is patterned as the negative pattern of the leads. Thereafter, the lead film 5 is formed by a sputter method, an evaporation method, or the like. In this case, the sputter method is preferable from view points of the cost and adhesive force. However, in the case that the sputter method is used, when the resist is peeled off with an organic solution such as acetone, the lead film 5 tends to be burred at the pattern edge portions. For example, in the case of a shield type AMR head, the burrs at the edge portions of the lead film 5 result in an insulation defect against an upper shield layer. Particularly, in an AMR head with an improved line resolution for a high record density of a recording medium (namely, an AMR head having a gap forming insulation film disposed between the AMR film 3 and the upper shield layer), an insulation defect tends to take place against the upper shield layer.

On the other hand, in the ion milling method, a lead film 5 composed of a Cu film or the like with a thickness of 100 to 200 nm is patterned just on the front surface of the AMR film 3 or with a slightly over-milled portion. In this case, due to the distribution of the thickness of the Cu film, the surface oxidized condition, the distribution of the intensity of ion beam, and so forth, it is difficult to determine the end point of the ion milling portion. Thus, this method has a problem in quantitative fabrication.

Since a giant magnetoresistance effect (hereinafter referred to as GMR) was discovered, in recent years, attempts for applying a GMR element for an MR head have been made so as to further improve high record density of recording apparatuses. Conventionally, the GMR film has a sandwich structure composed of a magnetic film, a non-magnetic intermediate film, and a magnetic film or a laminate structure that is composed of a plurality of magnetic film/non-magnetic film portions. The thickness of each film is on the order of several nanometers. The number of layers of the GMR film is larger than that of the conventional single-layered AMR film. In addition, the thickness of each layer of the GMR film is thin.

FIG. 2 shows the structure of principal portions of a conventional GMR head having a GMR film that is referred to as a spin valve (see J. Appl. Phys. VOL. 75, 6385 (1994) and so forth). As shown in FIG. 2, a spin valve film 6 has a structure of which a non-magnetic intermediate film 9 is disposed between a pair of ferromagnetic films 7 and 8. On the other hand, an antiferromagnetic film 10 such as a FeMn alloy film is formed on the ferromagnetic film 8 so that they contact each other. As with the AMR head, a lead film 5 composed of Cu or the like is patterned on the antiferromagnetic film 10.

The direction of the magnetization of the ferromagnetic film 8 is fixed in the direction in parallel with the signal magnetic direction Hsig of the medium by the antiferromagnetic film 10. The direction of the magnetization of the other ferromagnetic film 7 is rotated by an external magnetic field (signal magnetic field). The direction of the magnetization of the ferromagnetic film 7 is in parallel with the direction of the sense current. An antiferromagnetic film (or a hard magnetic film) 11 is disposed at both lower edge portions of a stripe of the spin valve film 6 so as to prevent a magnetic wall from taking place on the ferromagnetic film 7 of which the direction of the magnetization thereof is rotated by the signal magnetic field. The antiferromagnetic film (or the hard magnetic film 11) provides a bias magnetic field. (For details, see Japanese Patent Laid-Open Publication Nos. 62-40610 and 60-59518.)

As shown in FIG. 3, in the GMR head having the spin valve film 6, when the signal magnetic field H is 0, the resistance R thereof is between high and low. Depending on whether the signal magnetic field H is positive or negative, the resistance R varies between high and low. When the directions of magnetization of the layers of the spin valve film 6 have a difference of 90 degrees, the operating point bias is not required.

When a patterned lead film 5 is formed on the GMR film such as the spin valve film 6, since the thickness of each layer (7, 8, and 9) of the spin valve film 6 is as small as several nanometers, it is difficult to determine the timing for stopping the milling process. Thus, it is further difficult to equally mill the substrate as with the case of the AMR film. As described above, in the lift-off method, burrs take place. In the shield type MR head for high recording density, an insulation defect against the upper shield layer takes place.

In the conventional fabrication process for the GMR head as shown in FIG. 2, a hard magnetic film 11 that provides a bias magnetic field is formed and patterned. Thereafter, a laminate structure GMR film such as the spin valve film 6 is formed, patterned, and striped. After that, the lead film 5 is formed and patterned. In the conventional fabrication process for the GMR head, three steps of PEP (Photo Engraving Process) are required. Thus, the fabrication process is complicated and the fabrication cost rises.

As described above, in the conventional MR head structure, when a shield type head with a narrow gap is fabricated, if the MR element portion is patterned by the lift-off method, the pattern edges are burred and an insulation defect tends to take place. On the other hand, in the ion milling method, especially when a laminate structure GMR film is used, it is difficult to stop the milling process. Thus, it is difficult to obtain the MR element portion with high accuracy and high yield. In addition, when the MR element portion having the GMR film or the like is fabricated, three steps of PEP process are required, thereby increasing the fabrication cost.

SUMMARY OF THE INVENTION

Therefore, an object of the present invention is to provide a magnetoresistance effect head that allows shape accuracy and yield to be improved and that fabrication cost to be reduced. Another object of the present invention is to provide a fabrication method for a magnetoresistance effect head that allows shape accuracy and yield to be improved and that fabrication cost to be reduced. A further object of the present invention is to provide a magnetic recording/reproducing head suitable for a system with a high record density.

A first magnetoresistance effect head according to the present invention, comprises a magnetoresistance effect element portion including a magnetoresistance effect film having a magnetic field response portion, a magnetic field providing film for providing said magnetoresistance effect film with a bias magnetic field, and a conductor film for supplying a current to said magnetoresistance effect film, wherein said magnetoresistance effect element portion has a laminate structure portion being composed of at least said conductor film, said magnetic field providing film, and said magnetoresistance effect film layered in this order at other than said magnetic field response portion.

A second magnetoresistance effect head according to the present invention, comprises a magnetoresistance effect element portion including a magnetoresistance effect film having a magnetic field response portion, a magnetic field providing film for providing said magnetoresistance effect film with a bias magnetic field, and a conductor film for supplying a current to said magnetoresistance effect film, wherein said magnetoresistance effect element portion has laminate films composed of said magnetic field providing film and the conductor film that are layered in the order, said magnetic field providing films disposed below the conductor films being exposed at surfaces of edge portions on the magnetic field response portion side, and wherein said magnetoresistance effect film is formed between the exposed edge portions of the magnetic field providing films so that said magnetoresistance effect film overlaps with the exposed edge portions of said magnetic field providing films.

The magnetoresistance effect head according to the present invention is used as for example a shield type magnetoresistance effect head. When the magnetoresistance effect head according to the present invention is used as a shield type magnetoresistance effect head, the magnetoresistance effect element portion is disposed between a lower shield layer formed through a magnetic gap forming insulation film and an upper shield layer formed through another magnetic gap forming insulation film.

A first process for producing a magnetoresistance effect head according to the present invention, comprises the steps of laminating at least a conductor film for supplying a current to a magnetoresistance effect film and a magnetic field providing film for providing the magnetoresistance effect film with a bias magnetic field in the order, patterning a laminate film composed of the conductor film and the magnetic field providing film in a lead shape that defines a magnetic field response portion of the magnetoresistance effect film, forming the magnetoresistance effect film on the patterned laminate film and the magnetic field response portion, and patterning the magnetoresistance effect film corresponding to the lead shape and the shape of the magnetic field response portion.

A second process for producing a magnetoresistance effect head according to the present invention, comprises the steps of laminating at least a magnetic field providing film for providing a magnetoresistance effect film with a bias magnetic field and having a conductive characteristic and a conductor film for supplying a current to the magnetoresistance effect film in the order, patterning a laminate film composed of the magnetic field providing film and the conductor film corresponding to a lead shape that defines a magnetic field response portion of the magnetoresistance effect film so as to expose an edge portion of the magnetic field providing film on the magnetic response portion side, and forming the magnetoresistance effect film between the edge portions of the magnetic field providing film so that the magnetoresistance effect film overlaps with the exposed edge portions of the magnetic field providing film.

A first magnetic recording/reproducing head according to the present invention, comprises a reproducing head having the first magnetoresistance effect head applied as a shield type magnetoresistance effect head, and a recording head having an inductive magnetic head having a lower magnetic core and an upper magnetic core disposed through a magnetic gap, the lower magnetic core being composed of a magnetic layer that is commonly used with an upper shield layer of the magnetoresistance effect head.

A second magnetic recording/reproducing head according to the present invention, comprises a reproducing head having the second magnetoresistance effect head applied as a shield type magnetoresistance effect head, and a recording head having an inductive magnetic head having a lower magnetic core and an upper magnetic core disposed through a magnetic gap, the lower magnetic core being composed of a magnetic layer that is commonly used with an upper shield layer of the magnetoresistance effect head.

According to the first magnetoresistance effect head of the present invention, a laminate structure portion that has at least a conductor film, a magnetic field providing film, and a magnetoresistance effect film layered in the order forms a part of a passive region of a magnetoresistance effect element portion. In other words, the conductor film and the magnetic field providing film are formed below the magnetoresistance effect film corresponding to a lead portion. Thus, the conductor film and the magnetic field providing film can be pre-patterned corresponding to the lead shape. The entire substrate can be equally patterned by an ion milling process. Thus, the shape accuracy of the lead portion and the track portion and thereby the yield can be improved.

In addition, the pattern edge can be prevented from burring. When the magnetoresistance effect film is patterned corresponding to the lead shape, the entire substrate can be equally milled. Thus, a shape defect and characteristic deterioration due to excessively milled ions can be prevented.

According to the second magnetoresistance effect head, a laminate film that has a magnetic field providing film and a conductor film layered in the order forms a lead portion. A magnetoresistance effect film is formed between the exposed edge portions of the magnetic field providing film on a magnetic field response portion side so that the magnetoresistance effect film overlaps with the exposed portion of the magnetic field providing film. Thus, the laminate film of the magnetic field providing film and the conductor film can be pre-patterned in a lead shape. Consequently, the shape accuracy of the lead portion and the track portion and thereby the yield can be improved. In addition, the pattern edge can be prevented from burring. The magnetoresistance effect film is formed on only the magnetic field response portion except for the overlap portions of the exposed edge portions of the magnetic field providing films. The magnetic field providing film that overlaps with the magnetoresistance effect film properly supplies a bias magnetic field thereto. In addition, the magnetic field providing film properly supplies a current to the magnetoresistance effect film. When the magnetoresistance effect film is formed on almost only the magnetic field response portion, a fixing defect of magnetization or the like can be suppressed in the passive region. Thus, noise can be remarkably suppressed.

According to the process for producing the first magnetoresistance effect head of the present invention, after a laminate film of a conductor film and a magnetic field providing film is patterned corresponding to a lead shape, a magnetoresistance effect film is patterned corresponding to a lead shape and the shape of a track portion. Thus, with two steps of PEP process, a magnetoresistance effect element portion can be formed. Consequently, the fabrication process can be simplified and the fabrication cost can be reduced. When the substrate is patterned by ion milling process, it can be equally milled. Thus, the shape accuracy and yield can be improved. In addition, the pattern edge can be prevented from burring.

According to the process for producing the second magnetoresistance effect head, after a laminate film of a magnetic field providing film and a conductor film is patterned corresponding to a lead shape, a magnetoresistance effect film is formed between edge portions of the exposed surface of the magnetic field providing film so that the magnetoresistance effect film overlaps with the front surface of the edge portions. Thus, with one step of PEP process, a magnetoresistance effect element portion can be formed. Consequently, the fabrication process can be simplified and the fabrication cost can be reduced. In addition, since the lead portion can be patterned without need to consider the magnetoresistance effect film, the shape accuracy and yield can be improved.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Next, the present invention will be further described with embodiments.

Figure 1:
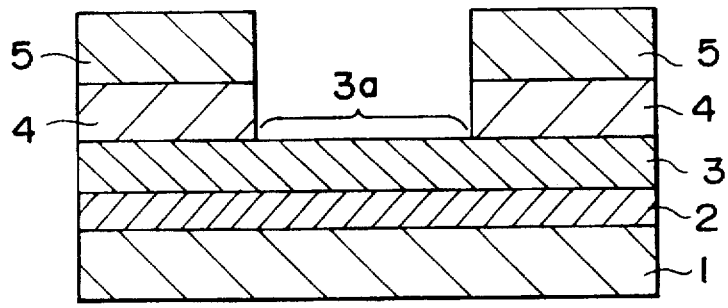
FIG. 1 is a sectional view showing principal portions of a magnetoresistance effect head having a conventional AMR film.
Figure 2:
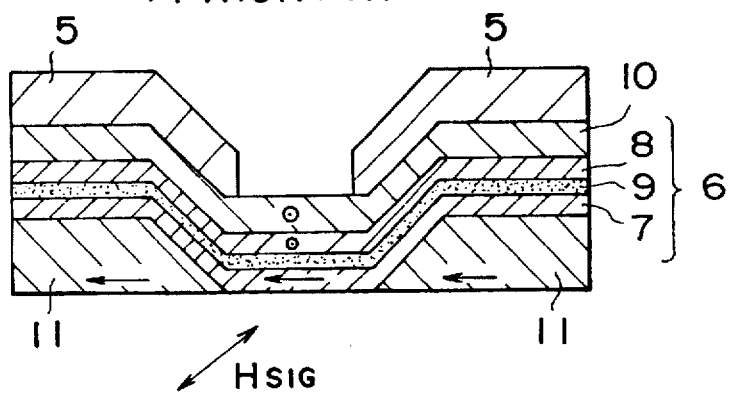
FIG. 2 is a sectional view showing principal portions of a magnetoresistance effect head having a conventional spin valve film.
Figure 3:
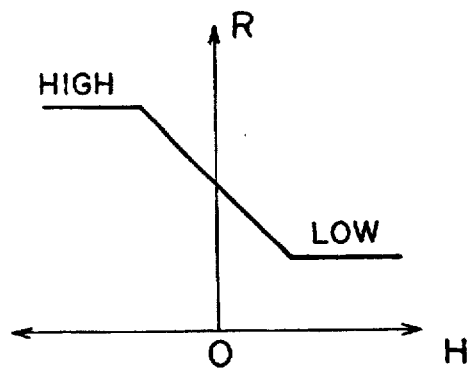
FIG. 3 is a graph showing a resistance change curve of a GMR head having a spin valve film with a bias for orthogonal directions of magnetization.
Figure 4:
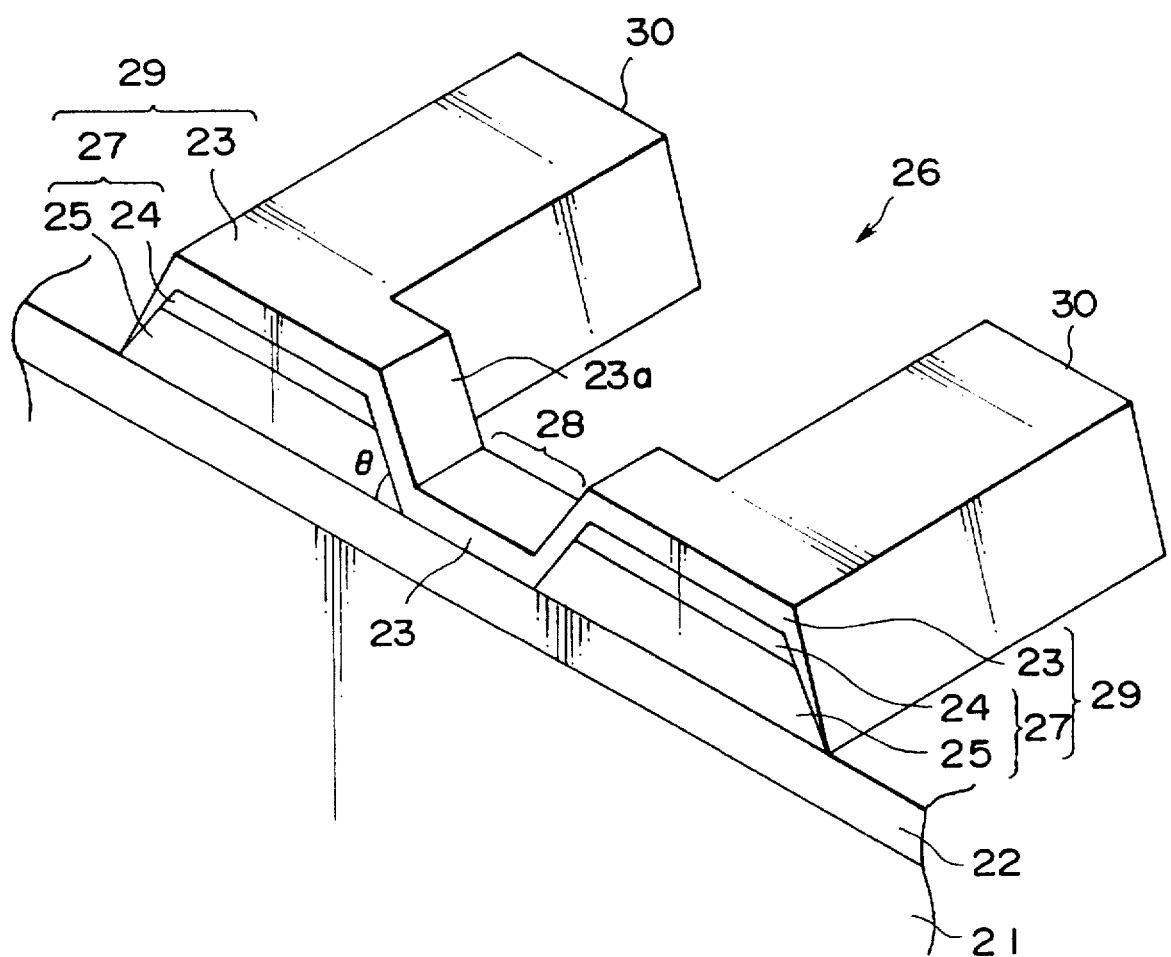
FIG. 4 is a perspective view showing principal portions of a magnetoresistance effect head according to a first embodiment of the present invention.

FIG. 4 is a perspective view showing the structure of principal portions of a magnetoresistance effect (MR) head according to a first embodiment of the present invention. In FIG. 4, reference numeral 21 is a substrate such as a Si substrate or $Al_2O_3 \cdot TiC$ substrate. An alumina film with a thickness of around 200 nm is formed as a base film 22 on the substrate 21. An MR element portion 26 is formed on the base film 22. The MR element portion 26 has a magnetoresistance effect film (MR film) 23, a magnetic field providing film 24, and a conductor film 25. The magnetic field providing film 24 provides the MR film 23 with a bias magnetic field. The thickness of the magnetic field providing film 24 is around 20 to 40 nm. The conductor film 25 is a lead film for supplying a current to the MR film 23. The thickness of the conductor film 25 is around 50 to 300 nm.

As a real structure of the MR element portion 23, a conductor film 25 composed of a Cu film or the like with a thickness of for example 100 nm is formed on a base film 22. The conductor film 25 is patterned so that the width of a track portion (magnetic field response portion) 28 of an MR film 23 (that will be described later) is defined (namely, the conductor film 25 is patterned with a predetermined gap on a medium opposite side). A hard magnetic film composed of for example a $Co_{80}Pt_{20}$ (at. %) film with a thickness of for example 40 nm is formed as a magnetic field providing film 24 that provides the MR film 23 with a bias magnetic field on the conductor film 25. The magnetic field providing film 24 covers the entire upper surface of the patterned conductor film 25.

A track side wall portion of a laminate film 27 composed of the conductor film 25 and the magnetic field providing film 24 is inclined for a predetermined angle θ (around 10 to 60°). A more preferable range of the angle θ is from 20 to 30°. When the angle is too small, it is difficult to precisely define the width of the track portion 28. In contrast, when the angle θ is too large, discontinuity of the magnetization tends to take place on the MR film 23 due to the gap between the track portion 28 and the laminate film 27. Thus, noise tends to become large. The track side wall portion of the laminate film 27 may have a plurality of angles. In reality, the conductor film 25 of the track side wall portion may have an angle in the range from 20 to 30°. The magnetic field providing film 24 of the track side wall portion may have an angle in the range from 10 to 20°.

The conductor film 25 may be composed of a MoW alloy film. The magnetic field providing film 24 may be composed of an antiferromagnetic film. At this point, when an amorphous film is disposed at the interface between the magnetic field providing film 24 and the conductor film 25, the characteristics of the magnetic field providing film 24 can be improved. For example, in the case that the $Co_{80}Pt_{20}$ film according to the embodiment is used as the magnetic field providing film 24, when a CoZrNb type amorphous film with a thickness of around 2 nm is disposed between a Cu film as the conductor film 25 and the magnetic field providing film 24, the crystal characteristics of the $Co_{80}Pt_{20}$ film are improved. Thus, as the crystal characteristics improve, the coercive force of the $Co_{80}Pt_{20}$ film rises, thereby improving the characteristics of the magnetic field providing film 24.

The MR film 23 is formed on the laminate film 27 and a portion between the track side wall portions of the laminate film 27. A stripe portion of the MR film 23 at the portion between the track side wall portions of the laminate film 27 forms a magnetic field response portion (namely, the track portion 28). Examples of the MR film 23 according to the present invention are an anisotropic magnetoresistance effect film, a spin valve film, and an artificial lattice film. The anisotropic magnetoresistance effect film is composed of $Ni_{80}Fe_{20}$ or the like of which the electric resistance varies corresponding to the angle between the direction of the current and the magnetizing moment of the magnetic layer. The spin valve film has a laminate structure composed of a ferromagnetic film and a non-magnetic intermediate film and provides a giant magnetoresistance effect (GMR).

In the MR element portion 26 shown in FIG. 4, the track portion 28 is composed of a single layer of the MR film 23. The passive region other than the track portion 28 is composed of laminate structure portions 29. The laminate structure portion 29 is composed of the conductor film 25, the magnetic field providing film 24, and the MR film 23 that are layered in the order. A taper portion 23a is formed between the track portion 28 of the MR film 23 and the upside of the laminate film 27 corresponding to the angle of the track side wall portion of the MR film 23. The taper portion 23a covers the track side wall portion of the laminate film 27. In the MR element portion 26, the laminate structure portions 29 at the rear on the medium opposite side function as a pair of leads 30.

Figure 5:
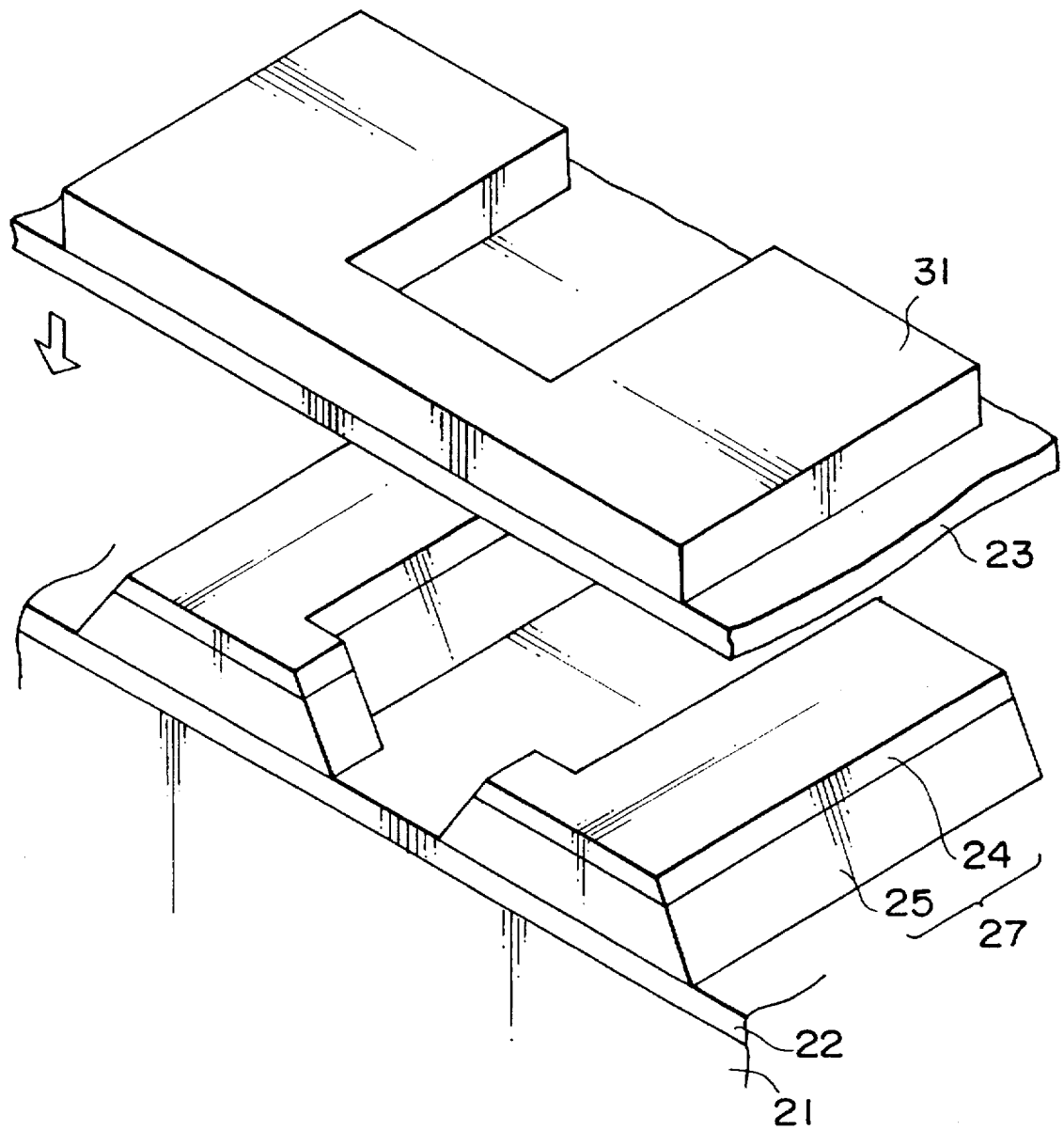
FIG. 5 is a perspective view showing principal portions of the magnetoresistance effect head shown in FIG. 4 in a fabrication process.

Next, with reference to FIG. 5, a fabrication process of the MR head according to the first embodiment will be described. In FIG. 5, a patterned laminate film 27, an MR film 23 that will be formed in the next fabrication step, and a milling mask 31 thereof are shown.

A Cu film with a thickness of 100 nm as the conductor film 25 and a $Co_{80}Pt_{20}$ film with a thickness of 40 nm as the magnetic field providing film 24, which provides a bias magnetic field, are successively formed on the base film 22 disposed on the substrate 21. As a result, a laminate film 27 is formed. Thereafter, the laminate film 27 is patterned in the above-described lead shape by for example the ion milling method. At this point, an ion beam is entered vertically or with an angle of up to around 60° to the vertical direction. The track side wall portion of the laminate film 27 is tapered so that the angle θ to the horizontal direction becomes 20 to 30°. The $Co_{80}Pt_{20}$ film as the magnetic field providing film 24 has a taper angle in the range from around 10 to 20°. This patterning process is the first step of the PEP process. The track side wall portion of the laminate film 27 can be angled by forming an angle to the resist at a relative high baking temperature of 423 K or more. In the first step the laminate film 27 on the base film 22 is patterned by the ion milling process. Thus, the substrate can be equally milled.

Next, as shown in FIG. 5, an MR film 23 composed of for example a $Ni_{80}Fe_{20}$ alloy with a thickness of for example 30 nm is formed on the patterned laminate film 27 by for example the sputter method. Thereafter, the MR film 23 is patterned. As shown in FIG. 5, a mask 31 for patterning the MR film 23 has a shape of which left and right leads 30 are connected with a track portion 28. In other words, the MR film 23 is patterned corresponding to the shape of the leads and the shape of the track portion 28. However, the MR film 23 to be patterned may be smaller than the laminate film 27. This patterning process is the second step of the PEP process. With such a mask 31, the magnetic field proving film 24 and the conductor film 25 are prevented from being removed by excessive ions milling. Thus, after the substrate is equally treated by milling, the MR element portion 26 can be precisely formed.

In the MR head according to the first embodiment, the magnetic field providing film 24 composed of a $Co_{80}Pt_{20}$ film and the MR film 23 are directly contacted at the leads 30, they are exchange-coupled. The magnetic field providing film 24 functions as a bias film for the MR film 23. In other words, a single magnetic domain is formed in the track portion 28 of the MR film 23. In addition, the rotation of magnetization of the MR film 23 other than the track portion 38 is suppressed. The direction of magnetization of the MR film 23 other than the track portion 28 is fixed by the bias magnetic field providing film 24. Thus, even if an external magnetic field deeply enters the MR film 23, it is not detected as a signal at other than the track portion 28. A taper portion 23a is formed between the track portion 28 of the MR film 23 and a laminated portion of the MR film 23 which is formed on an upper surface of the laminated film 27. The taper portion 23a alleviates the discontinuity of magnetization caused by the formation of steps between the track portion 28 and the laminated portion of the MR film 23, thereby suppressing noise from taking place.

In the structure of the MR element portion 26 according to the first embodiment and the fabrication process thereof, the leads 30 are composed of the conductor film 25, the magnetic field providing film 24, and the MR film 23 that are layered in the order. The laminate film 27 composed of the conductor film 25 and the magnetic field providing film 24 is pre-patterned in the lead shape by the ion milling process.

In the patterning process of the laminate film 27, the entire substrate can be equally milled. Moreover, in the patterning process of the MR film 23, since the MR film 23 is patterned in the shape of the leads and the shape of the track portion 28, the entire substrate can be equally milled.

Thus, the MR element portion 26 can be formed by two steps of the patterning process (namely, the PEP process). In addition, in all the steps, the entire substrate can be equally milled by the ion milling process. Consequently, the MR film 23 (in particular, the track portion 28) can be prevented from being improperly shaped due to an excessive etching process. Thereby, the decrease of the yield can be prevented. In addition, the fabrication process can be simplified and the fabrication process can be reduced. Moreover, since the pattern edges are prevented from being burred, a shield type MR head with a narrow gap can be properly fabricated.

The shield type MR head can be formed in the following manner. For example, a base film 22 is used as a lower gap forming insulation film. A lower shield layer composed of a soft magnetic substance is formed between the lower gap forming insulating film and the substrate 21. An upper shield layer composed of a soft magnetic substance is formed on the MR element portion 26 through the upper gap forming insulation film.

In the production process according to the abovedescribed embodiment, the laminate film 27 and the MR film 23 are patterned by the ion milling process. However, the process for producing the MR head according to the present invention is not limited to the above-described method. Instead, the MR head according to the present invention may be fabricated by another physical patterning method, a chemical reaction pattern method (such as a reactive ion etching (RIE) method or a chemical dry etching (CDE) method), a lift-off method, or the like. In these patterning methods, the fabrication process can be simplified and the fabrication cost can be reduced. However, to prevent the pattern edges from being burred, it is preferable to use a patterning method other than the lift-off method.

Figure 6:
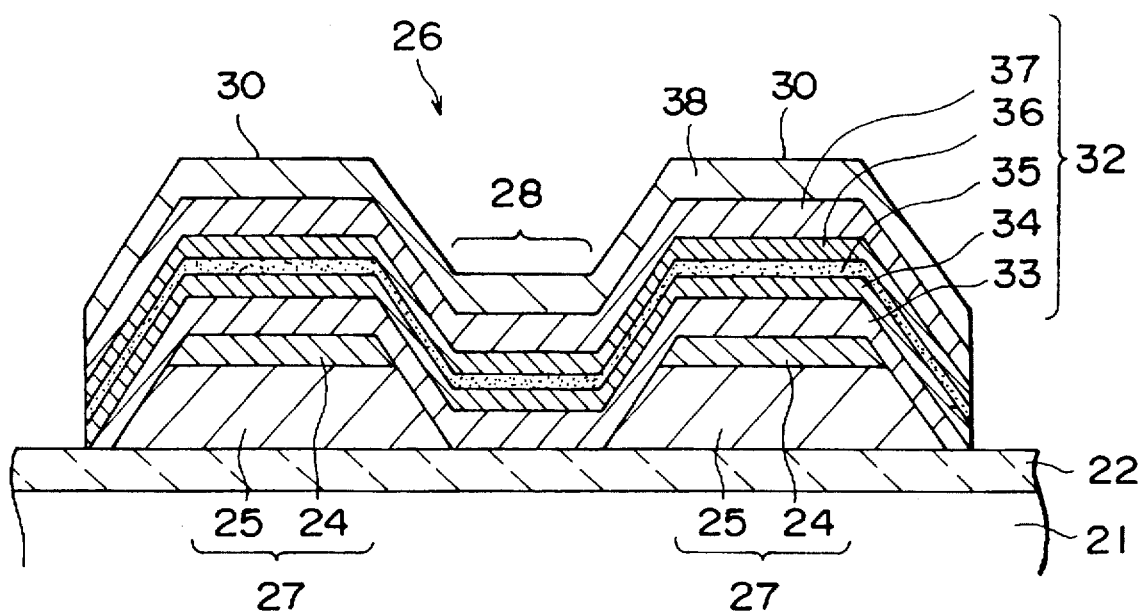
FIG. 6 is a sectional view showing an example of the structure of which a GMR film is used for the magnetoresistance effect head shown in FIG. 4.

FIG. 6 shows an example of the structure of which a GMR laminate film 32 is used for the MR film of the MR head according to the first embodiment. FIG. 6 shows principal portions of the structure viewed from the medium opposite side. The GMR laminate film 32 has for example a soft magnetic film 33 composed of a $Co_{86}Zr_8Nb_8$ amorphous film with a thickness of 10 nm, a first ferromagnetic film 34 composed of a $Co_{90}Fe_{10}$ alloy film with a thickness of 4 nm, a non-magnetic intermediate film 35 composed of a Cu film with a thickness of 3 nm, a second ferromagnetic film 36 composed of a $Co_{90}Fe_{10}$ alloy film with a thickness of 3 nm, and an antiferromagnetic film 37 composed of a FeMn alloy film with a thickness of 10 nm layered in the order. A protection film 38 composed of a Ti film with a thickness of 10 nm is formed on the antiferromagnetic film 37.

In the GMR laminate film 32, the first and second ferromagnetic films 34 and 36 disposed through the non-magnetic intermediate film 35 form so-called spin valve films. The direction of magnetization of the upper second ferromagnetic film 36 is fixed by the antiferromagnetic film 37. On the other hand, the direction of magnetization of the lower first ferromagnetic film 34 is rotated by an external magnetic field (signal magnetic field). Thus, the electric resistance of the GMR laminate film 32 varies corresponding to the angles of the directions of magnetization of the first and second ferromagnetic films 34 and 36. Consequently, so-called spin valve effect can be obtained.

The MR head having the above-described GMR laminate film 32 is fabricated in the same production process as the abovedescribed MR head. In other words, after a laminate film 27 composed of a conductor film 25 and a magnetic field providing film 24 is patterned, the layers 33, 34, 35, 36, and 37, which compose the GMR laminate film 32, and a protection film 38 are formed successively in the order by for example the sputter method. Thereafter, with a mask in a shape of which left and right leads are connected with a track portion 28, the laminate film is patterned. With two steps of the patterning process, an MR head having a GMR laminate film 32 can be fabricated.

In the MR head having the above-described GMR laminate film 32, the laminate film 27 composed of the conductor film 25 and the magnetic field providing film 24 patterned in the lead shape and the GMR laminate film 32 formed on the laminate film 27 function as a lead. Since the magnetic field providing film 24 composed of a hard magnetic film or the like in the laminate film 27 of which the side wall portion of the track portion 28 is tapered is directly contacted to the soft magnetic film 33 composed of a CoZrNb amorphous film or the like, they are exchange-coupled. Thus, the magnetic field providing film 24 functions as a bias magnetic field providing film. In addition, the magnetic field providing film 24 suppresses the direction of magnetization of the first ferromagnetic film 34 at other than the track portion 28 from rotating. Thus, even if an external magnetic field deeply enters the GMR element portion 26, the GMR laminate film 32 at other than the track portion 28 does not detect the external magnetic field as a signal.

In a conventional MR head having the GMR laminate film, the thickness of each layer of the MR element portion is thin. Thus, it is necessary to consider an excessively milled situation. On the other hand, in the MR head having the GMR laminate film 32 shown in FIG. 6, since the entire substrate is equally milled and thereby an MR element portion 26 is formed. Consequently, the shape accuracy and yield are remarkably improved. In addition, it is preferable to form the antiferromagnetic film 37, which fixes the magnetic domain of one of magnetic films composed of the spin valve films, on a magnetic film from a view point of crystal characteristics. Thus, the antiferromagnetic film 37 is normally formed on the upper second ferromagnetic film 36. An external magnetic field (signal magnetic field) causes the direction of magnetization of the lower first ferromagnetic film 34 to rotate. Thus, when the magnetic field providing film 24 is formed below the GMR laminate film 32, the shape accuracy and yield can be remarkably improved. In addition, a bias magnetic field can be provided for the first ferromagnetic film 34 of which the direction of magnetization thereof rotates.

In the above-described embodiment, the soft magnetic film 33 composed of a CoZrNb amorphous film is used as a film that is contacted to the magnetic field providing film 24. However, instead of the soft magnetic film 33, another soft magnetic film 33 can be used likewise. In addition, without the soft magnetic film 33, when the first ferromagnetic film 34 is contacted to the magnetic field providing film 24, the same effect can be obtained.

Figure 7:
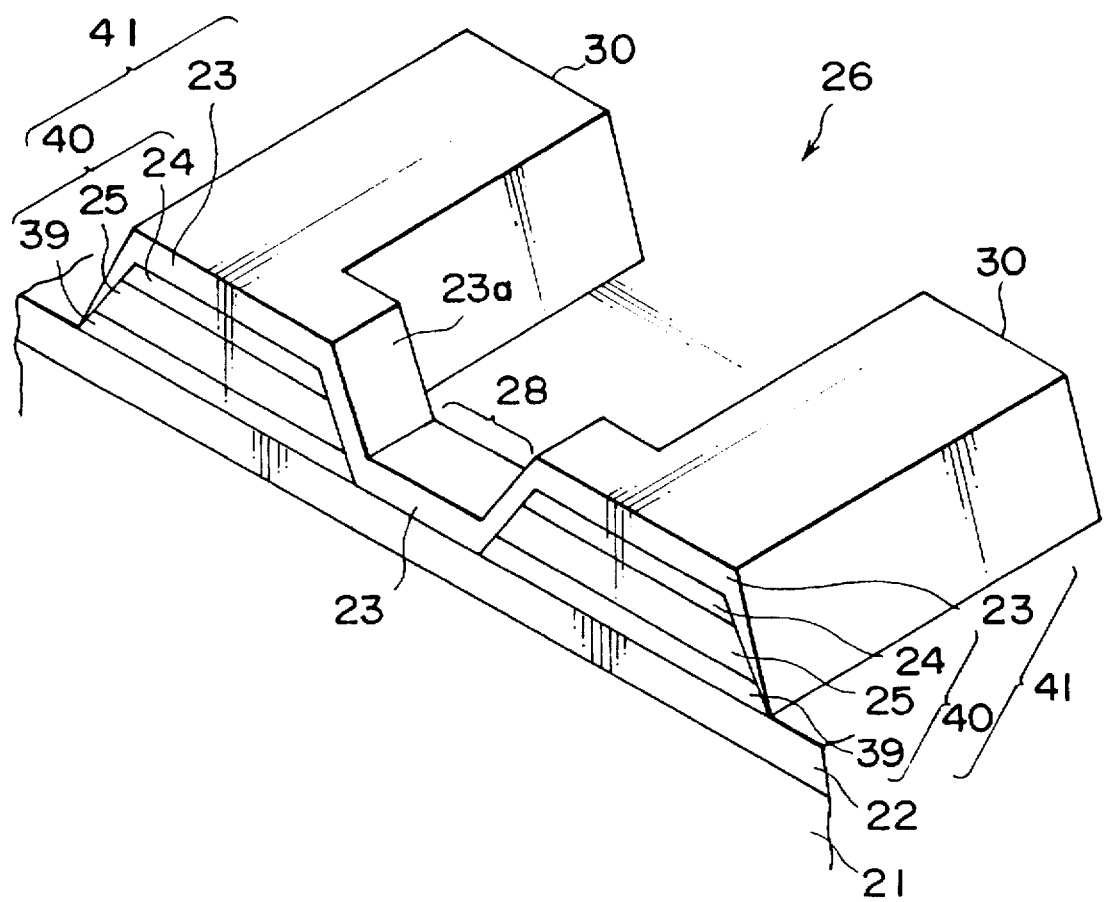
FIG. 7 is a perspective view showing principal portions of a magnetoresistance effect head according to a second embodiment of the present invention.
Figure 8:
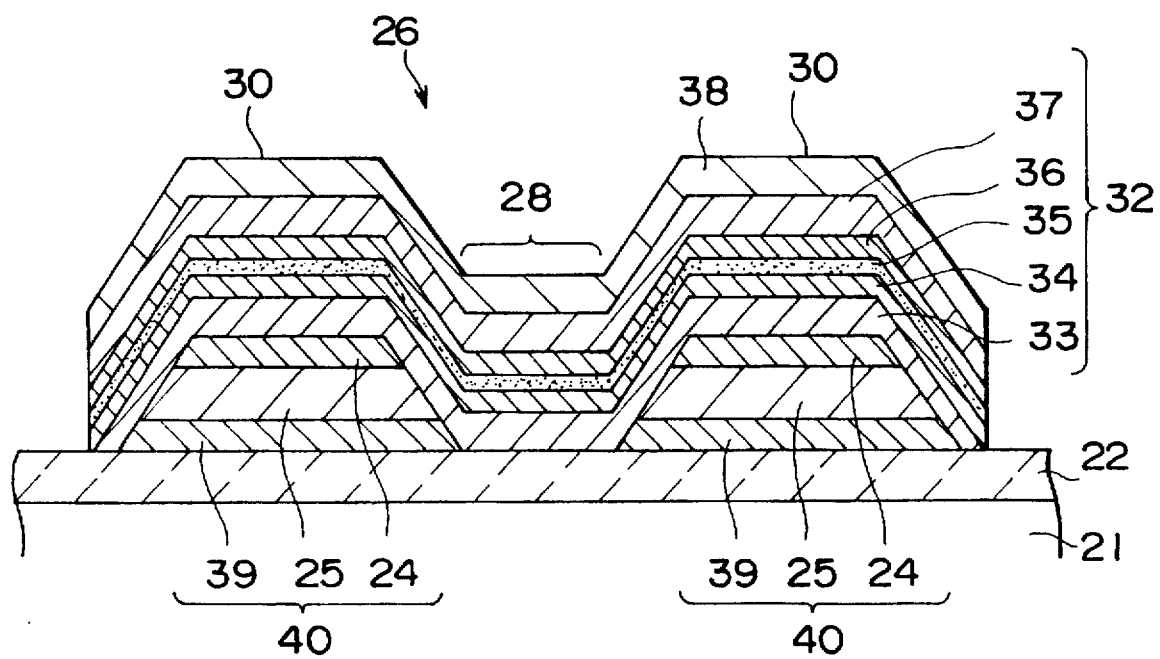
FIG. 8 is a sectional view showing an example of the structure of which a GMR film is used for the magnetoresistance effect head shown in FIG. 7.

Next, with reference to FIGS. 7 and 8, a second embodiment of the present invention will be described. FIG. 7 is a perspective view showing the structure of principal portions of an MR head according to the second embodiment of the present invention. FIG. 8 is a sectional view showing principal portions of an example of the structure of which a GMR laminate film 32 is used as an MR film for the MR head according to the second embodiment. FIG. 8 shows the structure seen from the medium opposite side.

As shown in FIGS. 7 and 8, the MR element portion 26 of the MR head according to the second embodiment has a magnetic field providing film 39 disposed below a conductor film 25 composed of a Cu film or the like along with a magnetic field providing film 24. In other words, a laminate film 40 composed of the magnetic field providing film 39, the conductor film 25, and the magnetic field providing film 24 is patterned in a lead shape. An MR film 23 is formed on the laminate film 40 and a portion between track side wall portions of the laminate film 40. In other words, a passive region other than the track portion 28 of the MR element portion 26 has a laminate structure portion 41 composed of the magnetic field providing film 39, the conductor film 25, the magnetic field providing film 24, and the MR film 23 layered in the order. The laminate structure portions 41 at the rear function as a pair of leads 30. The other structure is the same as the first embodiment. For simplicity, similar portions to those of the first embodiment are denoted by similar reference numerals.

In the MR head according to the first embodiment, (in particular, the MR head having the GMR laminate film 32), the GMR laminate film 32 extends from the track portion 28 to the laminate film 27. Thus, discontinuity of magnetization may take place in the GMR laminate film 32. Particularly, in the track portion 28, depending on the taper shape of the laminate film 27, magnetic domains may take place from both edges of the track portion 28 and cause Barkhausen noise in the soft magnetic film 33 of which the direction of magnetization is not fixed.

As shown in FIGS. 7 and 8, in the second embodiment, the magnetic field providing film 39 composed of for example a $Co_{80}Pt_{20}$ (at. %) film with a thickness of for example 15 nm is formed below the conductor film 25. In addition, the magnetic field providing film 24 composed of for example a $Co_{80}Pt_{20}$ (at. %) film with a thickness of for example 30 nm is formed above the conductor film 25. Thus, the soft magnetic film 33 at the lowest layer of the GMR laminate film 32 is directly contacted to the magnetic field providing film 39 at both edges of the track portion 28. Thus, discontinuity of magnetization due to bending of the GMR laminate film 32 is alleviated by the magnetic field providing film 39 contacted to both edges of the track portion 28. Thus, the generation of the magnetic domains at both edges of the track can be suppressed.

When an AMR film is used instead of the GMR laminate film 32, the lower magnetic field providing film 39 contributes to forming a single magnetic domain of the AMR film. In addition, the upper magnetic field providing film 24 contributes to fixing the direction of magnetization of the AMR film other than the track portion 28. Thus, noise can be suppressed. As with the first embodiment, in the second embodiment, when an amorphous film is disposed between the magnetic field providing film 24 and the conductor film 25, the characteristics of the magnetic field providing film 24 can be improved.

The MR head according to the second embodiment can be fabricated in the same manner as the process for producing the MR head according to the first embodiment. In other words, the magnetic field providing film 39, the conductor film 25, and the magnetic field providing film 24 are successively layered as the laminate film 40. The laminate film 40 is patterned in a lead shape by for example the ion milling process. For example, the taper angle of a CoPt film is smaller than the taper angle of a Cu film. An MR film 23 (for example, a GMR laminate film 32) is formed on the patterned laminate film 40. With a mask in a shape of which left and right leads are connected with a track portion 28, the MR film 23 is patterned. With two steps of the patterning process, the MR head can be fabricated with a high pattern accuracy and a high yield. In addition, the pattern edges can be prevented from being burred.

The MR head according to the second embodiment can be fabricated by the fabrication process shown in FIGS. 9A to 9F. FIGS. 9A to 9F show fabrication steps of which the structure of the MR head according to the second embodiment is used for a shield type MR head.

Figure 9A:
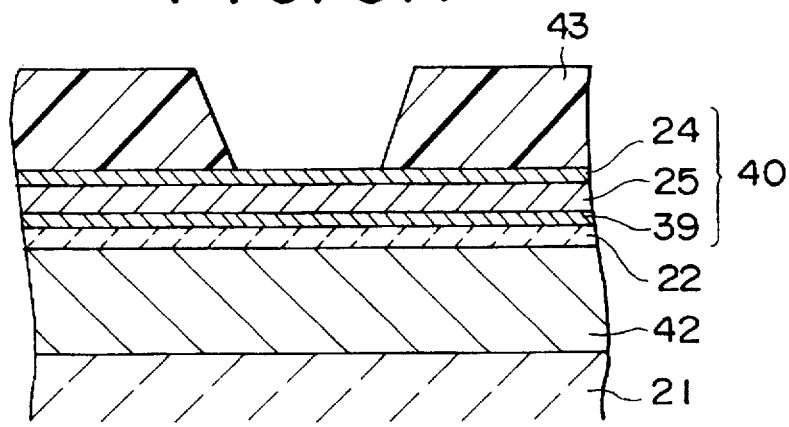
FIGS. 9A to 9F are sectional views showing principal fabrication steps of the magnetoresistance effect head shown in FIG. 7.

In other words, as shown in FIG. 9A, a CoZrNb amorphous soft magnetic film with a thickness of 1 Mm as a lower shield layer 42 and a base film 22 as a lower gap forming insulation film are successively formed on a substrate 21 composed of for example an altic ($Al_2O_3$·Tic) substrate having an alumina film. The base film 22 is composed of an alumina film with a thickness of for example 100 nm. Thereafter, a magnetic field providing film 39, a conductor film 25, and a magnetic field providing film 24 are successively formed on the base film 22 as a laminate film 40. In reality, for example, a laminate film composed of a $Co_{80}Pt_{20}$ (at. %) film with a thickness 40 nm, a $Mo_{70}W_{30}$ (at. %) film with a thickness of 100 nm, and a $Co_{80}Pt_{20}$ (at. %) film with a thickness of 40 nm is formed on the base film 22. A resist in the shape of leads is formed on the laminate film 40.

Figure 9B:
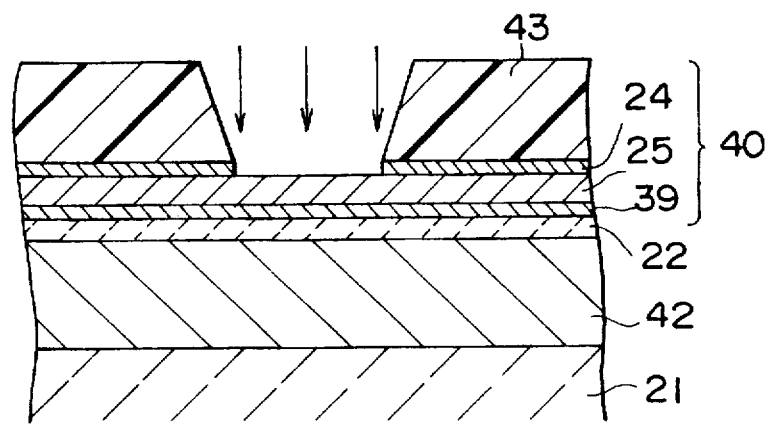
Figure 9C:
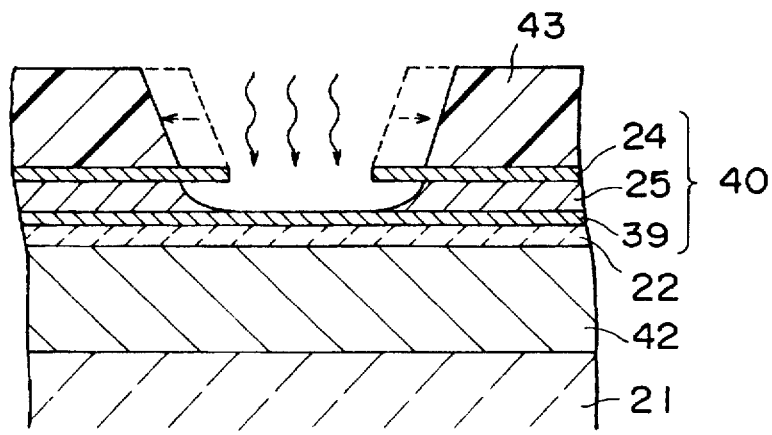

Next, as shown in FIG. 9B, with a mask in the shape of the leads, the upper magnetic field providing film 24 composed of for example a CoPt film is patterned by the ion milling method. Thereafter, as shown in FIG. 9C, with a mixed gas of $CF_4$ and $O_2$, the conductor film 25 composed of a MoW alloy film is patterned by the chemical etching process (CDE). At this point, the ratio of $O_2$ and $CF_4$ (for example, $O_2/CF_4=3$) of which the resist is also etched out is selected. The CDE process should be performed so that the magnetic field providing films 24 and 39 composed of for example a CoPt film are not etched out. By the CDE process, the resist 42 and the conductor film 25 disposed above and below the magnetic field providing film 24 are etched out. At this point, the conductor film 25 is patterned so that the upper surface of the lower magnetic field providing film 39 at edge portions of the track is exposed for around 0.2 μm.

Figure 9D:
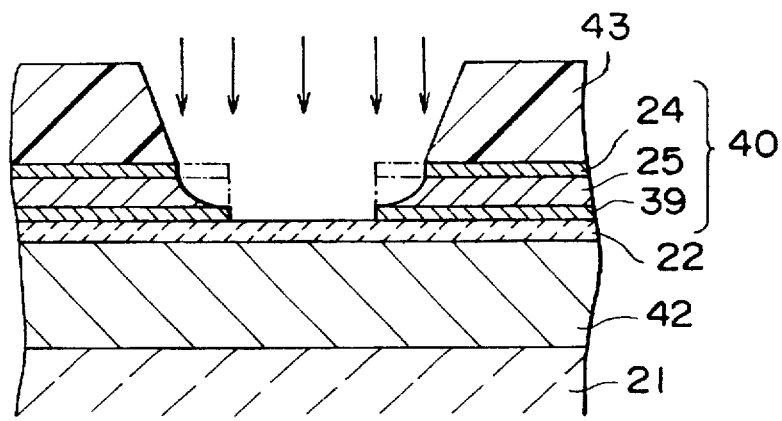

Thereafter, as shown in FIG. 9D, with a mask of the upper magnetic field providing film 24, the lower magnetic field providing film 39 composed of for example a CoPt film is patterned by the ion milling method. At this point, the lower magnetic field providing film 39 corresponding to the track portion 28 is removed. The upper magnetic field providing film 24 corresponding to other than the track portion 28 is removed. Thus, the shape of the upper magnetic field providing film 24 formed corresponding to the resist 43 (namely, the shape of the track portion) is transferred to the lower magnetic field providing film 39. By removing the resist 43, a laminate film 40 patterned in the lead shape is obtained.

Figure 9E:
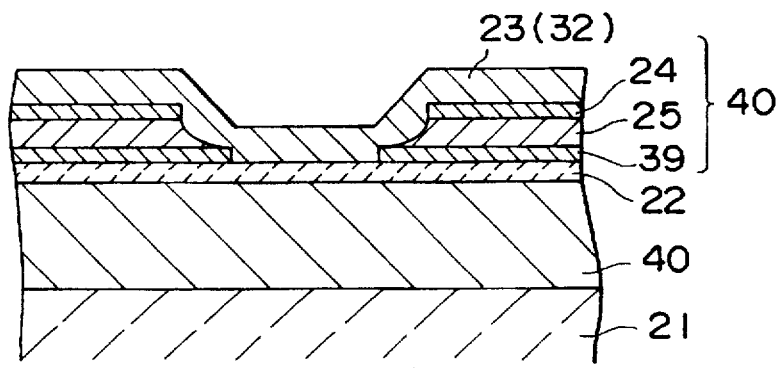
Figure 9F:
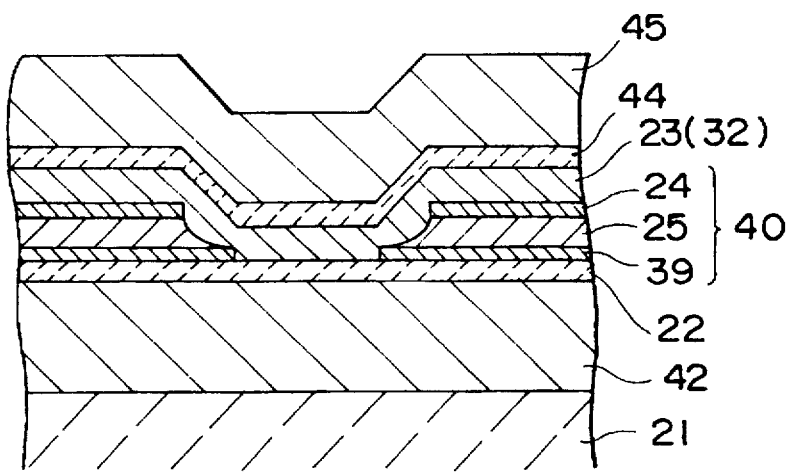

Thereafter, as shown in FIG. 9E, an MR film 23 (for example, a GMR laminate film 32) is formed on the patterned laminate film 40. With a mask in a shape of which left and right leads are connected with a track portion 28, the MR film 23 is patterned by the ion milling process. In addition, as shown in FIG. 9F, an alumina film with a thickness of 100 nm as an upper gap forming insulation film 44 and a CoZrNb amorphous soft magnetic film with a thickness of around 1 μm as an upper shield layer 45 are formed on the patterned MR film 23. As a result, a shield type MR head is obtained.

By the above-described production process, the MR film 23 is directly contacted to the exposed portion of the lower magnetic field providing film 39 corresponding to the portion between edge portions of the track. The area of the exposed surface of the lower magnetic field providing film 39 is satisfactorily larger than the thickness thereof. Thus, the lower magnetic field providing film 39 can securely exchange-coupled the outside portions of both edges of the track portion 28 of the MR film 23. In other words, the width of the track portion 28 can be more precisely defined.

In addition, by the CDE process, the track side wall portions of the conductor film 25 can be more smoothly formed. Thus, the leads and the upper shield layer 45 can be securely insulated. By the CDE process with the above-described conditions, the width of the track portion depends on the edge portions of the lower magnetic field providing film 39 that is not etched out. Thus, the width of the track can be properly controlled.

When for example a Ti film with a thickness of around 5 nm is formed between the lower gap forming insulation film 22 and the magnetic field providing film 39, the adhesive strength can be improved.

Figure 10:
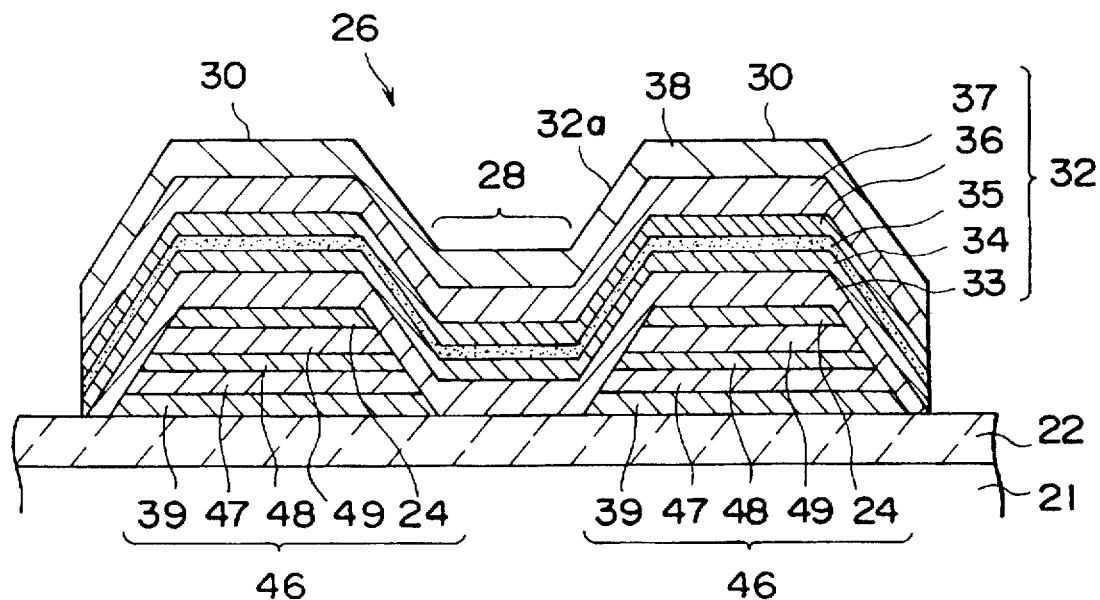
FIG. 10 is a sectional view showing a modification of the magnetoresistance effect head shown in FIG. 8.

FIG. 10 is a sectional view showing a modification of the MR head according to the second embodiment. In the MR element portion 26 shown in FIG. 10, a laminate film 46 corresponding to a lead portion is composed of a first magnetic field providing film 39, a first conductor film 47, a second magnetic field providing film 48, a second conductor film 49, and a third magnetic field providing film 24. As a real example, the laminate film 46 is composed of a $Co_{80}Pt_{20}$(at. %) film 39 with a thickness of 20 nm, a Cu film 47 with a thickness of 40 nm, a $Co_{80}Pt_{20}$ (at. %) film 48 with a thickness of 20 nm, a Cu film 49 with a thickness of 40 nm, and a $Co_{80}Pt_{20}$ (at. %) film 24 with a thickness of 20 nm. In other words, in the MR head according to the second embodiment shown in FIG. 8, the laminate film 46 has the magnetic field providing film 48 in the middle of the conductor film 25.

The laminate film 46 allows the direction of magnetization of the taper portion 32a of the GMR laminate film 32 to be securely fixed. In the above-described embodiment, the three-layer magnetic field providing film was exemplified. However, it should be noted that a laminate film that has more magnetic field providing films may be used.

Next, a magnetic recording/reproducing head having the above-described MR head according to an embodiment of the present invention will be described with reference to FIG. 11.

Figure 11:
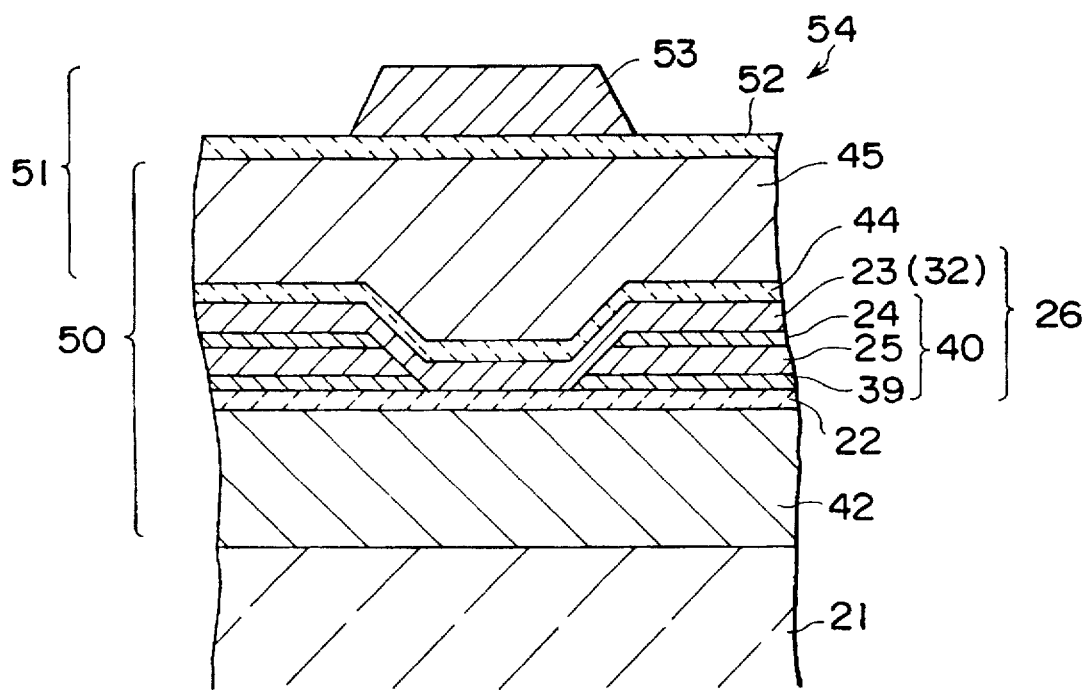
FIG. 11 is a sectional view showing the structure of a magnetic reproducing head according to an embodiment of the present invention.

In FIG. 11, reference numeral 21 is a substrate composed of for example an $Al_2O_3$·TiC substrate having an $Al_2O_3$ film. A lower shield layer 42 composed of a soft magnetic material such as a NiFe alloy or a CoZrNb amorphous alloy is formed on the substrate 21. An MR element portion 26 shown in FIGS. 7 and 8 is formed on the lower shield layer 42 through a lower reproducing magnetic gap film 22 composed of an insulation film such as $Al_2O_3$. FIG. 11 shows the MR element portion 26 shown in FIGS. 7 and 8. However, it should be noted that the MR element portion 26 shown in FIGS. 4 and 6 or the MR element portion shown in FIG. 10 can be used.

An upper reproducing magnetic gap film 44 composed of an insulation film such as $Al_2O_3$ is formed on the MR element portion 26. An upper shield layer 45 composed of the same soft magnetic material as the lower shield layer 42 is formed on the resultant structure. As a result, a shield type MR head 50 that functions as a reproducing head is obtained.

A recording head composed of an induction type thin film magnetic head 51 is formed on a reproducing head composed of the shield type MR head 50. The upper shield layer 45 of the shield type MR head 50 also functions as a lower magnetic core of the induction type thin film magnetic head 51. An upper magnetic core 53 is formed on the lower magnetic core 45 through a recording magnetic gap film 52 composed of such as $Al_2O_3$. As a result, an induction type thin film magnetic head 51 is obtained. A recording head that is the induction type thin film magnetic head 51 and a reproducing head that is the shield type MR head 50 compose a magnetic recording/reproducing head 54.

In the magnetic recording/reproducing head 54, the shield type MR head 50 that functions as a reproducing head has a high shape accuracy and provides a high reproducing characteristic. Thus, the recording/reproducing characteristics of the magnetic recording/reproducing head 54 can be improved. In addition, since the edge portions of the lead portions are not burred, even if the thickness of the upper reproducing magnetic gap layer 44 is reduced for high line resolution, the insulation defect or the like does not take place. In other words, the magnetic recording/reproducing head 54 can be satisfactorily used for a high density recording system.

Figure 12:
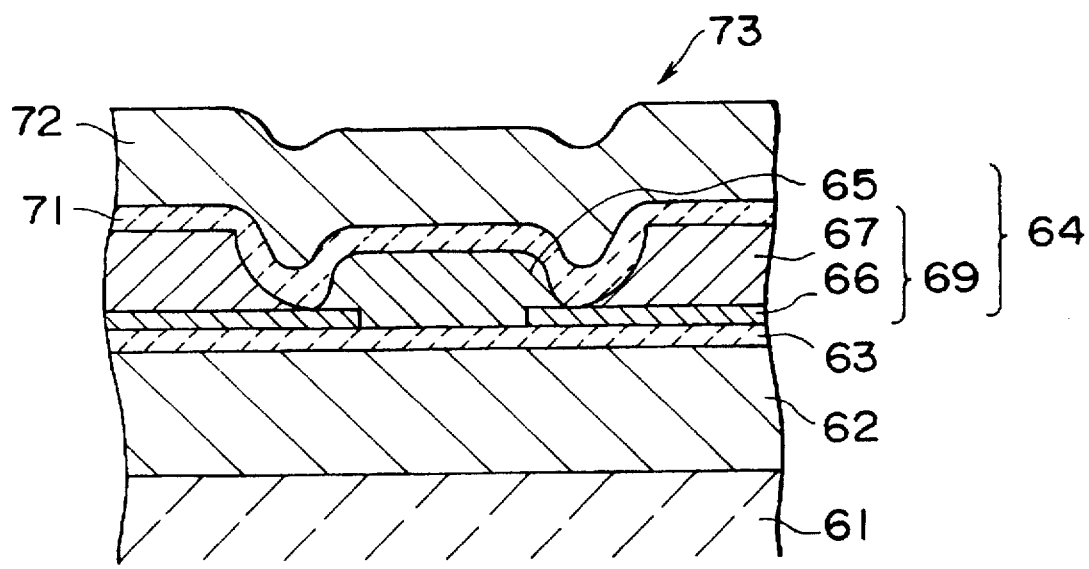
FIG. 12 is a sectional view showing principal portions of a magnetoresistance effect head according to another embodiment of the present invention.
Figure 13:
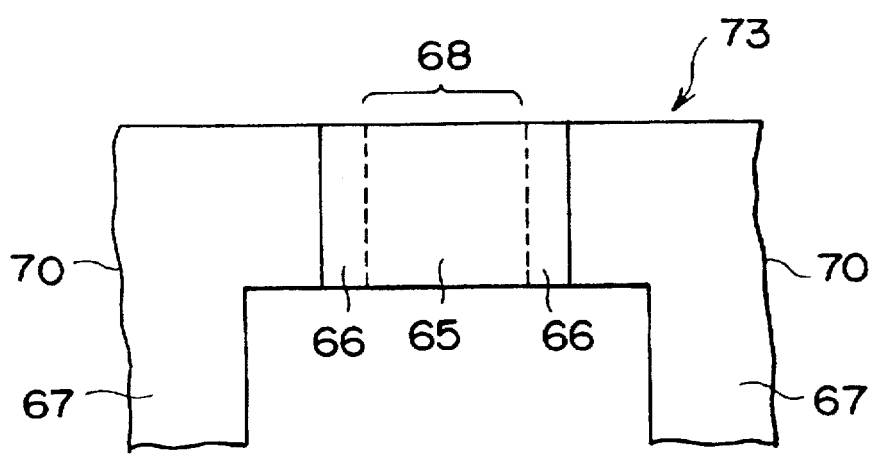
FIG. 13 is a plan view showing principal portions of the magnetoresistance effect head shown in FIG. 12.

Next, an MR head according to another embodiment of the present invention will be described with reference to FIGS. 12 and 13. FIG. 12 is a sectional view showing principal portions of an MR head according to the embodiment. FIG. 12 is a view seen from the medium opposite side. FIG. 13 is a plan view of the MR head.

As shown in FIGS. 12 and 13, a lower shield layer 62 composed of a soft magnetic material such as an NiFe alloy or a CoZrNb amorphous alloy is formed on a substrate 61 composed of an $Al_2O_3$·TiC having a $Al_2O_3$ film. An MR element portion 64 is formed on the lower shield layer 62 through a lower gap film 63 composed of such as an $Al_2O_3$ film with a thickness of around 100 nm. The MR element portion 64 has an MR film 65, a magnetic field providing film 66 that provides the MR film 65 with a bias magnetic field, and a conductor film that functions as a lead film that supplies a current to the MR film 65.

As a real structure of the MR element portion 64, a hard magnetic film composed of for example a $Co_{80}Pt_{20}$ (at. %) film with a thickness of for example 20 nm is formed as the magnetic field providing film 66, which provides the MR film 65 with a bias magnetic field, on the lower gap film 63. The magnetic field providing film 66 is composed of a hard magnetic film, an antiferromagnetic film, or the like that has an electric conductive characteristic. The magnetic field providing film 66 is patterned so that a magnetic field response portion of the MR film 65 (namely, the width of the track portion 68) is defined. In other words, the magnetic field providing film 66 is patterned in a lead shape that has a predetermined gap on the medium opposite side.

A conductor film 67 composed of for example a $Mo_{70}W_{30}$ (at. %) film with a thickness of 100 nm is formed on the magnetic field providing film 66 so that the upper surface of the magnetic field providing film 66 corresponding to the portion between edge portions of the track portion 68 is exposed for around 0.2 μm. The magnetic field providing film 66 and the conductor film 67 compose a laminate film 69. The laminate film 69 functions as a pair of leads 70.

The MR film 65 is formed on the exposed portion of the magnetic field providing film 66 corresponding to a portion between edge portions of the track portion 68 so that the MR film 65 overlaps with the exposed portion of the magnetic field providing film 66. In other words, the MR film 65 is formed in only the active region except for the overlap portion of the exposed portion of the magnetic field providing film 66. The magnetic field providing film 66 that overlaps with the MR film 65 provides it with a bias magnetic field. The conductor film 67 supplies a current to the MR film through the magnetic field providing film 66. The MR film 65 has an anisotropic magnetoresistance effect film and a GMR laminate film that are the same as those used in each of the above-described embodiments.

An upper shield layer 72 composed of a soft magnetic material similar to the lower shield layer 62 is formed on the MR element portion 64 through an upper gap film 71 composed of for example an Al$_2$O$_3$ film with a thickness of around 100 nm. As a result, a shield type MR head 73 is obtained.

Next, with reference to FIGS. 14A to 14E and 15, a fabrication process of the shield type MR head 73 according to the above-described embodiment will be described.

Figure 14A:
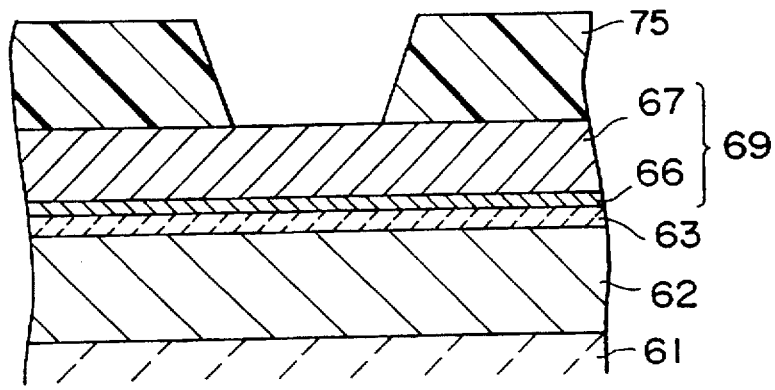
FIGS. 14A to 14E are sectional views showing principal fabrication steps of the magnetoresistance effect head shown in FIG. 12.

First, as shown in FIG. 14A, a lower shield layer 62 and a lower gap film 63 are successively formed on a substrate 61 composed of for example an altic (Al$_2$O$_3$·TiC) substrate having an alumina film formed on the front surface thereof. Thereafter, a magnetic field providing film 66 and a conductor film 67 are successively formed on the lower gap film 63. As a result, a laminate film 69 is obtained. A resist 75 corresponding to the shape of leads and the shape of a track portion 68 is formed on the laminate film 69.

Figure 14B:
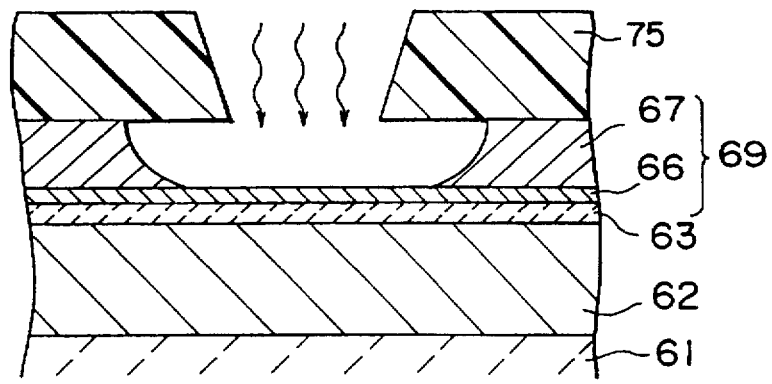

Next, as shown in FIG. 14B, with a mixed gas of CF$_4$ and O$_2$, a conductor film 67 composed of for example a MoW alloy film is etched out by the chemical dry etching (CDE) process with a mask of the resist 73. At this point, the ratio of O$_2$/CF$_4$ (for example, O$_2$/CF$_4$=1) is selected so that only the conductor film 67 rather than the resist 75 is etched out. The CDE process should be performed so that the magnetic field providing film 66 composed of for example a CoPt film is not etched. By the CDE process, while the resist 75 has the shape of the track portion 68, only the conductor film 67 formed below the track portion 68 is patterned. At this point, the conductor film 67 is patterned so that the magnetic field providing film 66 is exposed for around 0.2 μm corresponding to the portion between the edge portions of the track portion.

Figure 14C:
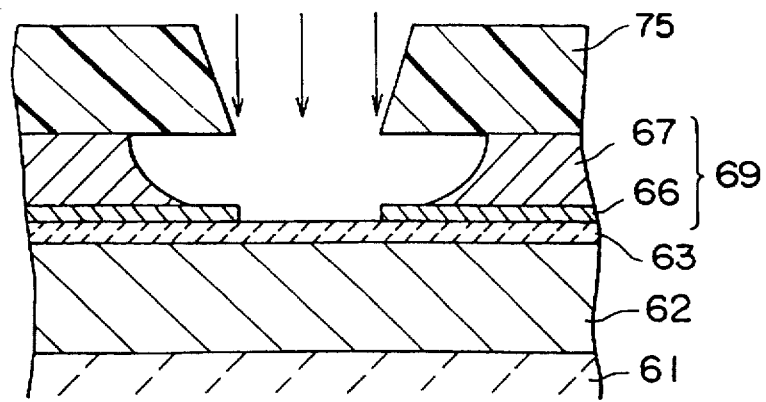
Figure 14D:
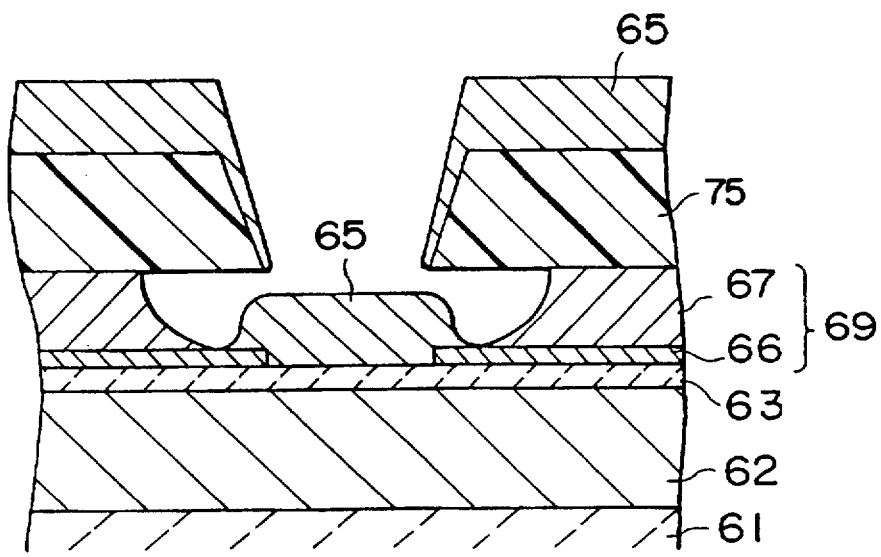

Next, as shown in FIG. 14C, with a mask of the resist 75, the magnetic field providing film 66 composed of for example a CoPt film is patterned by the ion milling process. By the ion milling process, a portion corresponding to the track portion 68 is formed. As shown in FIG. 14D, an MR film 65 is formed on the resist 75. At this point, due to a protrusion of the MR film 65, the MR film 65 partially overlaps with the exposed portion of the magnetic field providing film 66 corresponding to the portion between the edge portions of the track portion.

Figure 14E:
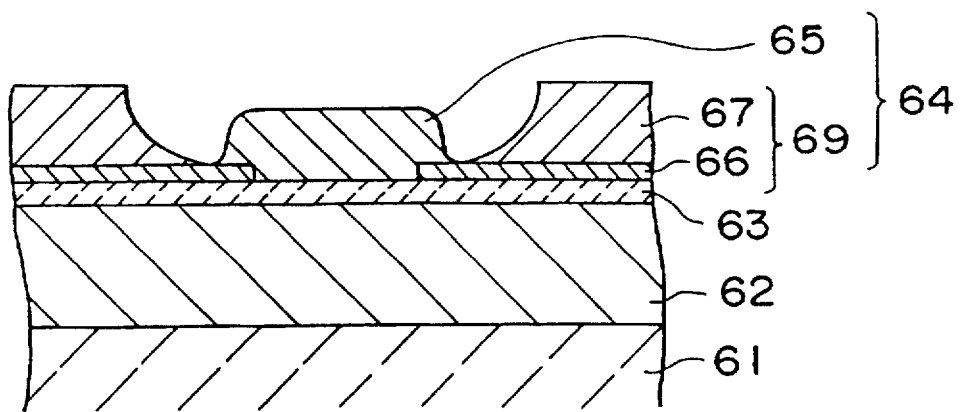
Figure 15:
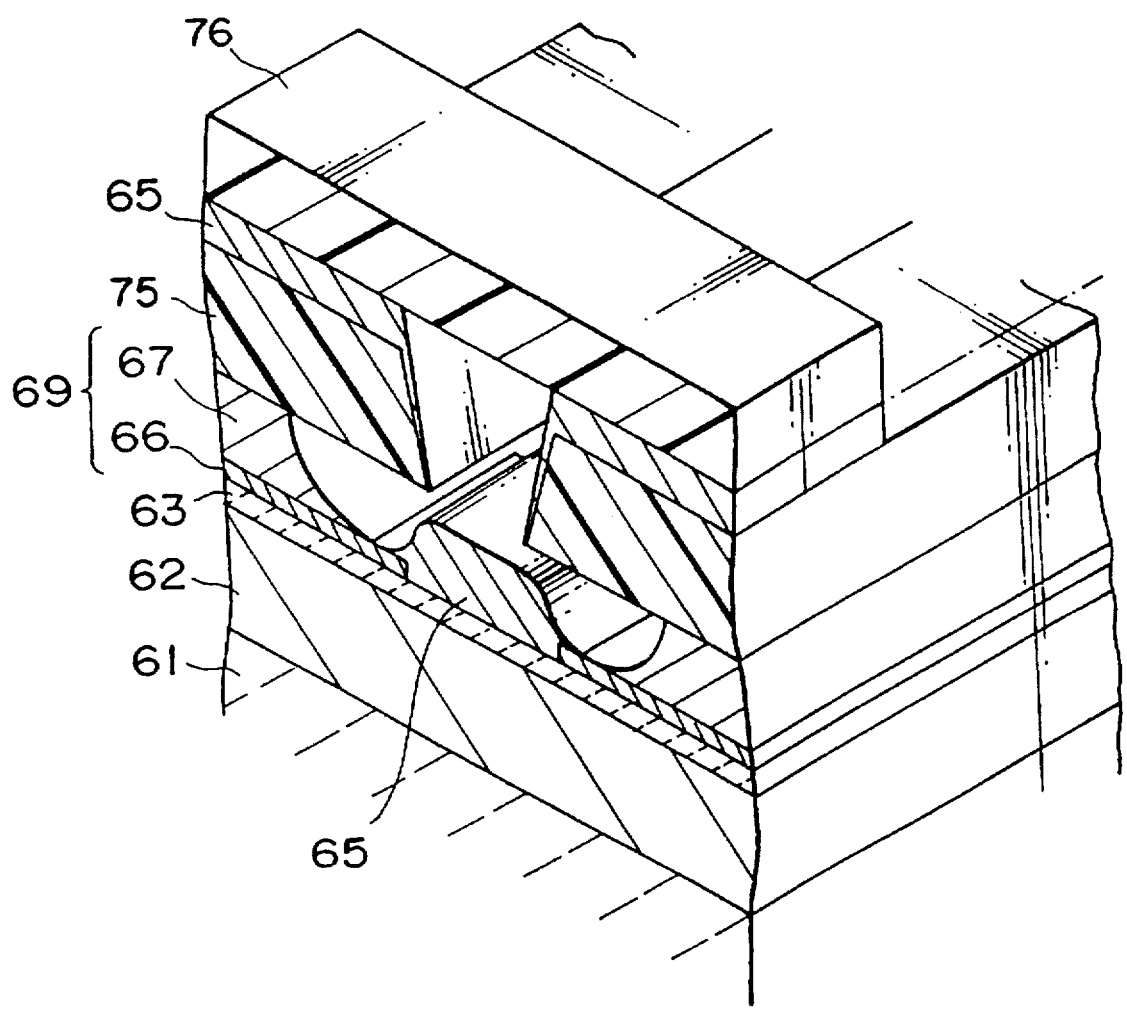
FIG. 15 is a perspective view showing a fabrication step of the magnetoresistance effect head shown in FIG. 12.

Thereafter, as shown in FIG. 15, a resist 76 corresponding to the depth end line of the MR film 65 is formed. With a mask of the resist 76, the depth end portion of the MR film 65 is removed by the ion milling process. As shown in FIG. 14E, by removing the resists 75 and 76, the MR film 65 can be formed on almost only the track portion 68. As a result, an MR element portion 64 is obtained. Thereafter, the upper gap film 71 and the upper shield layer 72 are successively formed on the MR element portion 64. As a result, a shield type MR head 73 shown in FIGS. 12 and 13 is obtained.

In the shield type MR head 73 according to the above-described embodiment, since the MR film 65 is formed on almost only the track portion (active region), a fixing defect of magnetization can be suppressed in the passive region. Thus, noise can be remarkably suppressed. A bias magnetic field can be properly supplied from the magnetic field providing film 66 to the MR film 65. In addition, a current can be properly supplied to the MR film 65 through the magnetic field providing film 66. The bias magnetic field and the current can be more properly supplied than the abut junction type structure of which the MR film is formed at only the track portion. Moreover, since the magnetic field providing film 66 is plainly formed, good characteristics can be obtained.

Before the MR film 65 is formed, the shape of the leads and the shape of the track portion can be formed with one step of the conventional PEP process. Thus, the shape accuracy and the yield can be improved. In addition, after the depth end of the MR film 65 has been determined, since the unnecessary portion of the MR film 65 has been removed, only the resists 75 and 76 are removed. Thus, unlike with the lift-off process, since substances that have been removed are not bonded in a solvent, an insulation defect does not take place. Since the lead shape has been designated and the MR film 65 has been formed through the resist 75, as long as the MR film 65 does not protrude behind the resist 75, theoretically burrs do not take place. Thus, the insulation against the upper shield layer 72 can be remarkably improved. Consequently, a shield type MR head with a narrow gap can be satisfactorily fabricated.

As clear from the above-described embodiments, according to the present invention, a magnetoresistance effect type head that is free of burring at a pattern edge and that has an excellent shape accuracy can be provided with a high yield. In addition, according to a process for producing the magnetoresistance effect type head according to the present invention, the fabrication process can be simplified and the fabrication cost can be reduced.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A magnetoresistance effect head comprising a magnetoresistance effect element portion, said magnetoresistance effect element portion comprising:

a pair of electrodes disposed on a plane and separated with a gap portion;

a pair of magnetic field providing films for providing a magnetic bias to a magnetoresistance effect film, said pair of magnetic field providing films being formed on each of the pair of electrodes to form a pair of laminate films; and said magnetoresistance effect film formed on said pair of laminate films and said gap portion, said magnetoresistance effect film being composed of laminated portions formed over the laminate films and a magnetic field response portion formed on the gap portion, said magnetoresistance effect film receiving a current from the pair of electrodes, wherein said electrodes, said magnetic field providing films, and said magnetoresistance effect film of said laminated portions are successively layered in this order as a laminate structure on the plane and further wherein at least a portion of the magnetoresistance effect film and at least a portion of the electrodes are disposed along the plane.

2. The magnetoresistance effect head as set forth in claim 1, wherein said magnetoresistance effect film is a multilayered film comprising a pair of ferromagnetic layers and a nonmagnetic intermediate layer disposed between the pair of ferromagnetic layers.

3. The magnetoresistance effect head as set forth in claim 1, wherein said magnetoresistance effect head further comprises a lower shield layer disposed under said magnetoresistance effect element portion and an upper shield layer disposed above said magnetoresistance effect element portion.

4. The magnetoresistance effect head of claim 1 wherein, said magnetoresistance effect film is coextensive with the laminate films.

5. The magnetoresistance effect head as set forth in claim 1, wherein side wall portions on a magnetic field response portion side of the laminate films are tapered, and wherein said laminated portions of said magnetoresistance effect film have tapered portions on a magnetic field response portion side, said tapered portions of the magnetoresistance effect film being adapted for covering the side wall portions of the laminate films.

6. The magnetoresistance effect head as set forth in claim 5, wherein the side wall portions on the magnetic field response portion side of the laminate films are angled 10° to 60° with respect to said plane.

7. The magnetoresistance effect head as set forth in claim 5, wherein the side wall portions on the magnetic field response portion side of the laminate films are tapered with a plurality of stages.

* * * * *